United States Patent
Bourlai et al.

(10) Patent No.: US 9,449,217 B1
(45) Date of Patent: Sep. 20, 2016

(54) IMAGE AUTHENTICATION (71) Applicant: West Virginia University, Morgantown, WV (US)

(72) Inventors: Thirimachos Bourlai, Morgantown, WV (US); Nnamdi Osia, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 14/751,014

(22) Filed: Jun. 25, 2015

(51) Int. Cl.
G06K 9/00 (2006.01)
G06K 9/34 (2006.01)
G06K 9/46 (2006.01)
G06K 9/62 (2006.01)
G06T 7/00 (2006.01)

(52) U.S. Cl.
CPC ....... G06K 9/00288 (2013.01); G06K 9/00228 (2013.01); G06K 9/00268 (2013.01); G06K 9/00604 (2013.01); G06K 9/6201 (2013.01); G06T 7/0079 (2013.01)

(58) Field of Classification Search
CPC .................. G06K 9/00288; G06K 9/00604; G06K 9/00228; G06K 9/6201; G06K 9/00268; G06K 9/00221; G06K 9/00281; G06K 9/00248; G06T 7/0079
USPC ........ 382/100, 103, 115, 117, 118, 151, 162, 382/168, 169, 171, 172, 173, 181, 190, 254, 382/274, 305, 298, 289; 348/739, 744, 759, 348/760, 761; 702/16; 359/252, 250; 358/448, 443, 471, 403, 518
See application file for complete search history.

(56) References Cited

U.S. PATENT DOCUMENTS

| | | | |
|---|---|---|---|
| 7,069,149 B2 | 6/2006 | Goff et al. | |
| 7,931,194 B2 | 4/2011 | Keys | |
| 7,972,266 B2 * | 7/2011 | Gobeyn | A61B 3/113 348/222.1 |
| 8,295,557 B2 * | 10/2012 | Wang | G06T 7/0081 382/118 |
| 8,326,001 B2 * | 12/2012 | Free | G06K 9/00228 382/103 |
| 8,385,971 B2 * | 2/2013 | Rhoads | G06F 17/30244 382/162 |
| 8,396,265 B1 | 3/2013 | Ross et al. | |
| 8,457,367 B1 | 6/2013 | Sipe et al. | |
| 8,542,879 B1 | 9/2013 | Nechyba et al. | |
| 8,983,152 B2 * | 3/2015 | Lewis | G06K 9/00248 382/118 |
| 9,082,235 B2 * | 7/2015 | Lau | G07C 9/00 |
| 2013/0027187 A1 | 1/2013 | Yepez | |
| 2014/0079296 A1 | 3/2014 | Cleland et al. | |

(Continued)

OTHER PUBLICATIONS

Nnamdi Osia and Thirimachos Bourlai. "Holistic and Partial Face Recognition in the MWIR Band using Manual and Automatic Detection of Face-based Features." 2012 IEEE Conference on Technologies for Homeland Security (HST). pp. 273-279 (Waltham, MA, Nov. 2012).

(Continued)

*Primary Examiner* — Sheela C Chawan
(74) *Attorney, Agent, or Firm* — Spilman Thomas & Battle, PLLC; Richard W. James (57) ABSTRACT

A system, apparatus, and method for authenticating a person for access using an image of the face of that person. The system includes a camera, a data storage device, and a processor of a mobile device. The system compares a current image of the face of the subject to a stored image of the face of that subject and/or an image of the face of that subject provided by the subject and confirms that the same subject is depicted in both images.

20 Claims, 4 Drawing Sheets

(56) References Cited

U.S. PATENT DOCUMENTS

2015/0002392 A1* 1/2015 Kempinski ............ A61B 3/113
345/156
2015/0261996 A1* 9/2015 Kim .................. G06K 9/00255
348/14.03

OTHER PUBLICATIONS

Thirimachos Bourlai, Arun Ross, and Anil Jain. "On Matching Digital Face Images Against Scanned Passport Photos." Proceedings of First IEEE International Conference on Biometrics, Identity and Security (BIdS). pp. 1-10 (Tampa, FL, Sep. 2009).

Thirimachos Bourlai, Arun Ross, and Anil K. Jain. "Restoring Degraded Face Images: A Case Study in Matching Faxed, Printed, and Scanned Photos", IEEE Transactions on Information Forensics and Security, vol. 6, No. 2 (Jun. 2011), pp. 371-384.

Antwan Clark and Thirimachos Bourlai. "Enhancing passport images for face recognition", SPIE Newsroom, Oct. 9, 2013.

Di Wen, Hu Han, and Anil K Jain. "Face Spoof Detection with Image Distortion Analysis", IEEE Transactions on Information Forensics and Security, vol. 10, No. 4 (Apr. 2015), pp. 746-761.

Gang Pan, Zhaohui Wu and Lin Sun (2008). "Liveness Detection for Face Recognition." in: Recent Advances in Face Recognition, Kresimir Delac, Mislav Grgic and Marian Stewart Bartlett (eds.), pp. 109-124. Vienna, Austria: InTech.

Unsang Park, Raghavender Reddy Jillela, Arun Ross, and Anil K. Jain, "Periocular Biometrics in the Visible Spectrum." IEEE Transactions on Information Forensics and Security. vol. 6, No. 1 (Mar. 2011). pp. 96-106.

Junjie Yan, Zhiwei Zhang, Zhen Lei, Dong Yi, Stan Z. Li. "Face Liveness Detection by Exploring Multiple Scenic Clues." IEEE International Conference on Control, Automation, Robotics and Vision (ICARCV), 2012.

Dakshina R. Kisku, Massimo Tistarelli, Jamuna Kanta Sing, Phalguni Gupta. "Face Recognition by Fusion of Local and Global Matching Scores using DS Theory: An Evaluation with Uni-classifier and Multi-classifier Paradigm". IEEE Computer Vision and Pattern Recognition Workshops. pp. 60-65. (2009).

Fernando Roberti De Siqueira, William Robson Schwartz, Helio Pedrini. "Adaptive Detection of Human Skin in Color Images." IX Workshop de Visão Computacional (WVC), Rio de Janeiro-RJ, Brazil, pp. 1-6, Jun. 3-5, 2013.

Chutisant Kerdvibulvech. "A methodology for hand and finger motion analysis using adaptive probabilistic models." EURASIP Journal on Embedded Systems 2014, 2014:18.

"Liveness Detection." http://1uapps.com/services/liveness/ (Accessed Jun. 25, 2015). Hoyos Labs Corp.

"CheckEnrol Kiosk." http://www.modi-gmbh.de/en/product-detail/produkt-xyz (Accessed Jun. 25, 2015). MODI Modular Digits GmbH.

* cited by examiner

IMAGE AUTHENTICATION

CROSS-REFERENCE TO RELATED APPLICATIONS

None.

FIELD OF THE INVENTION

The present invention is concerned with identifying an individual from one or more images of that individual that include the individual's face. Embodiments of the invention permit access to a mobile device application once the individual is identified as an approved user.

BACKGROUND OF THE INVENTION

Computer based recognition of a person from an image of that person's face has been thought to be beneficial for a variety of biometric security functions. A number of attempts have been made to recognize a person by his or her unique facial features, including scanning a face and attempting to identify repetitive movements of the face during the scan, infrared scanning and matching of a face with a photograph, measuring fractal image code measurement using a Euclidean norm, nearest-neighbor matching, eigenface matching, and Bayesian face recognition.

Identifying a person using his or her image, while shown in popular culture, has not yet received general acceptance, possibly because it is unreliable. Thus there is a need for systems, apparatuses, and methods of identifying a person from the person's image.

At the present time, use of portable devices, including cell phones, tablets, and hybrid or regular laptops is an everyday experience for many people. Such portable devices have built-in sensors, including cameras, and thus, have become multimedia devices. Different biometric traits have been used in commercial biometric-related products, including face, fingerprints and iris, with a variety of biometric recognition approaches proposed using one or more biometric traits, including Principal Component Analysis, Linear Discriminant Analysis, Local Binary Patterns and fusion techniques at the image, feature or score level.

In face recognition, the conventional approaches are typically evaluated in still face images captured under controlled conditions. However, those approaches do not work well when using still images and videos captured under unconstrained conditions.

Thus, there is a need for the development of portable systems, apparatuses, and methods for identifying a person from one or more face images of that person.

SUMMARY OF THE INVENTION

Embodiments of image authentication are directed to systems, methods and apparatuses for confirming the identity of a person or to permitting access to a person approved for such access.

Embodiments of the present image authentication apparatuses, systems, and methods may use a variety of image processing to improve performance of a system that seeks to identify a person through one or more images.

In accordance with one embodiment of image authentication, an image authentication system includes a mobile device camera for capturing a current image of a subject in ambient visible light, a data storage device in the mobile device having at least one of an image of the subject and data created from an image of the subject that includes features of the subject discernable in visible light, and a processor in the mobile device coupled to the data storage device and the camera. In that embodiment, the processor includes instructions which, when executed by the processor, cause the processor to: receive the image from the camera, convert the image received from the camera to greyscale if the image is in color, detect the eyes of the subject in the image, move a face of the subject in the image to fix at least one of the left eye and the right eye in a predetermined position in an image field, scale the face in the image to a standard size based on the location of the eyes in the image, equalize lighting on a left side of the face and a right side of the face, binarize the image, identify features of the face, remove segments having fewer than a predetermined number of contiguous pixels from the features of the face, mask the image to remove segments around the face, including ears and neck of the subject, compare the current image to a stored image, and determine whether the current image and the stored image display the face of the same person.

Embodiments of the present image authentication apparatuses, systems, and methods may compare one or more live images of a person to a photograph of the person. That photograph may, for example, be a license or passport form of identification so that a determination may be made as to whether the person in the photograph is the person identified in the license or passport.

Another embodiment of the present image authentication apparatuses, systems, and methods may take the additional step of confirming that the person in the photograph and the live images is approved for access to a system or facility by comparing at least one of the photograph and the live images to at least one stored image of one or more people permitted to access the system or facility to confirm that the person is permitted such access.

In accordance with one embodiment of image authentication, a method of authenticating an image includes receiving the image from the camera, converting the image received from the camera to greyscale if the image is in color, detecting eyes of a subject in the image, moving a face of the subject in the image to fix at least one of the left eye and the right eye of the subject in a predetermined position in an image field, scaling the face in the image to a standard size based on the location of the eyes in the image, equalizing lighting on a left side of the face and a right side of the face, binarizing the image, grouping contiguous pixels in the binarized image into segments, identifying features of the face, removing segments having fewer than a predetermined number of contiguous pixels from the features of the face, masking the image to remove segments around face, including ears and neck of the subject, comparing the current image to a stored image, and determining whether the current image and the stored image display the face of the same person.

Accordingly, the present invention provides solutions to the shortcomings of prior image authentication systems, apparatuses, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of image authentication devices, methods, systems, and networks.

FIG. 1 illustrates an embodiment of a facial authentication system and process.

DETAILED DESCRIPTION OF THE INVENTION

Reference will now be made to embodiments of apparatuses, systems, and methods for image authentication, examples of which are illustrated in the accompanying drawings. Details, features, and advantages of those apparatuses, systems, and methods for image authentication will become further apparent in the following detailed description of embodiments thereof. It is to be understood that the figures and descriptions included herein illustrate and describe elements that are of particular relevance to apparatuses, systems, and methods for image authentication, while eliminating, for purposes of clarity, other elements found in typical computerized access systems.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
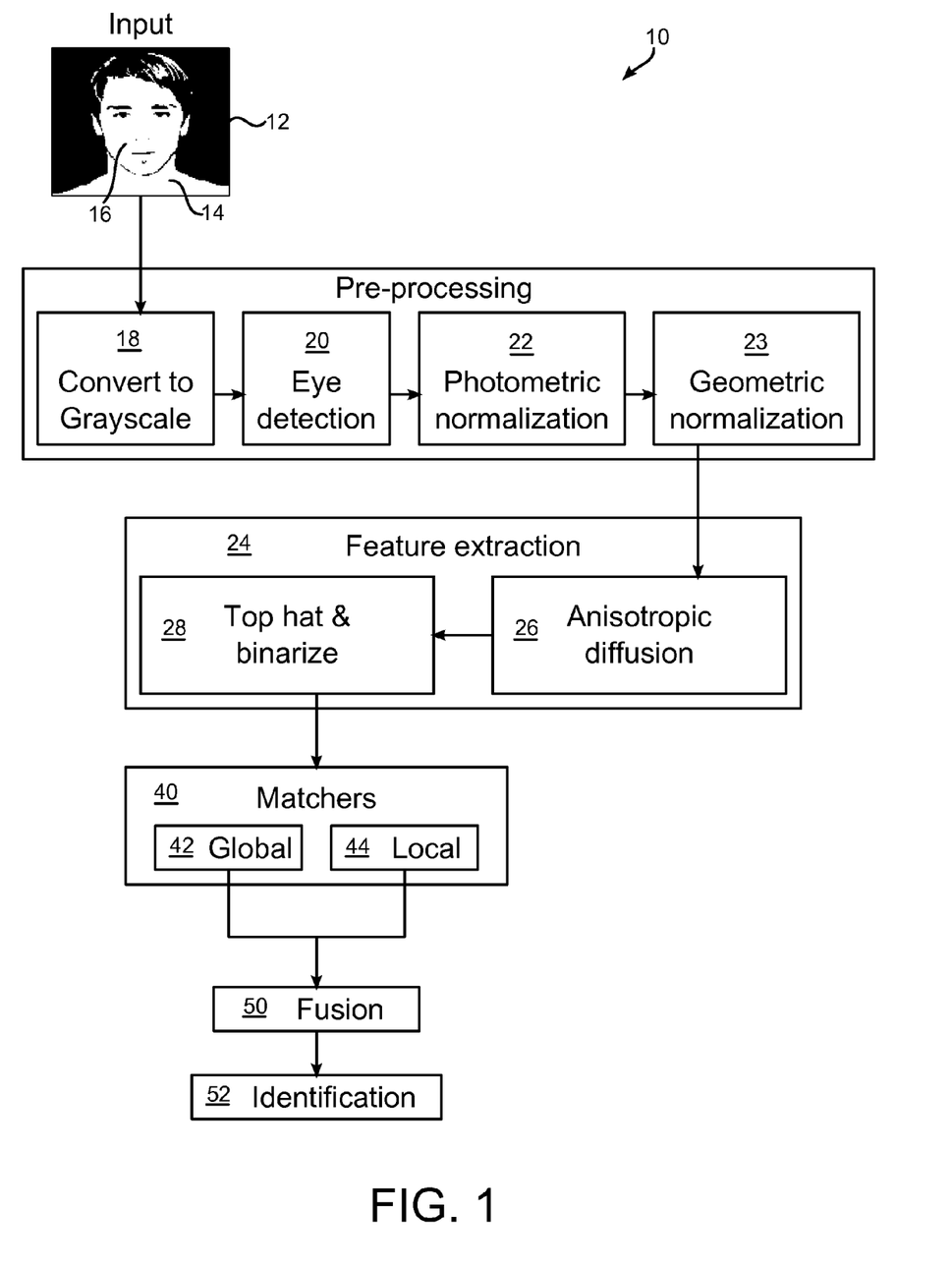

FIG. 1 illustrates an embodiment of an authentication system and process 10 that includes identifying facial features from one or more images 12. An image may be a photograph or a frame of a video or other image. Where the image is analog, it may be digitized or converted to digital form for further processing. The image 12 may furthermore include a human subject 14.

In that embodiment, a sensor 302, 304 (illustrated in FIG. 3), which may be a type of camera, captures one or more visible light images 12 when actuated. The at least one image 12 may include as a portion of that image or all of that image an image of a visible face 16. The image 12 or portion of the image 12 that includes the visual face 16 may be transmitted to and received by a processor 950 (illustrated in FIG. 4) for processing.

It should be noted that the system and method 10 described herein includes processing the image 12 including human subject 14 and face 16 in (depending on the embodiment) multiple ways (e.g., at 18, 20, 22, 23, 24 (including 26 and 28), 40 (including 42 and 44), 50, or 52) and each processing step may change the image. Thus, each form of processing, unless indicated, may take a version of the image 12 that was subject to one or more previous steps of processing. However, for simplicity, we continue to refer to the image by 12 (including 14 and 16), recognizing that the image may not be in original form.

If the one or more images 12 are color images or otherwise not in greyscale format, the images 12 may be converted to greyscale by the processor 950 as is illustrated at 18.

Detection of eyes in one or more images 12 may be performed by the processor 950 as shown at 20 to determine where the eyes are in the image 12 and, possibly, to determine the location of the face 16 in the image 12 by scaling from the eyes to a normalized face size.

At 22, the processor may photometrically normalize on the face 16 for illumination invariance, for example, to eliminate the effects of illumination variations, such as local shadowing and highlights, while still preserving the essential elements of visual appearance for more efficient face recognition. Photometric normalization 22 of the face 16 may precede or follow geometric normalization 23 of the face 16. A technique, such as histogram equalization, can be performed, for example, by dividing the face 16 in the image 12 into a left side and a right side and a distribution of pixel intensity can be determined for the left side of the face 16, which may be referred to as the left tile, and for the right side of the face, which may be referred to as the right tile. The histogram equalization may be of the contrast-limited adaptive type, to normalize the pixel intensity distribution in each portion of the image 12. Histogram equalization may also be performed on the whole face 16 in the image 12. The equalized whole face image may then be combined with the equalized left side and ride side to alleviate illumination variance that may exist during acquisition, for example, because of different environmental conditions existing at the time of acquisition.

At 23, the processor 950 may geometrically normalize the face 16 of image 12. Geometric normalization 23 of the face 16 may follow detecting the eyes 20 in the face 16. Each eye may be placed in a fixed position by enlarging or reducing the image 12 or face 16 or by moving the image 12 or face 16 left, right, up or down, to the extent necessary to place the eyes in the predetermined positions. The image resulting from such geometrical normalization 23 of the image 12 or face 16 may be referred to as a geometrically normalized face image.

Geometrically normalizing the face 16 may, for example, include moving the face 16 until one of the left eye and the right eye is in a first predetermined position in an image field. Scaling the face 16 may include expanding or contracting the face around the first predetermined location until the second of the left eye and the right eye is in a second predetermined location lying on a horizontal line of pixels. It should be recognized that the first predetermined position may be a predetermined pixel at which the first eye is centered and the second predetermined location may be on a vertical line of pixels or within a range of pixels.

Features may then be identified or extracted from the geometrically and photometrically normalized face image 16 at 24. Feature extraction forms lines or other shaped groupings of pixels based on the subject of the photograph's physiology and the contours and geometric shape of the subject's face. Feature extraction may include anisotropic diffusion 26, which may reduce noise in the image 12 and face 16 while preserving facial content and without removing significant parts of the face image content, typically face edges, lines or other facial features that are important for the interpretation of the face image. Diffusion may include convolution of the original image 12 with a Gaussian filter that increases in width. Facial content may include facial features such as the nose, eyes, and mouth.

Image noise includes spurious and extraneous information in an image such as the geometrically normalized 23 image 12 that likely did not exist in the subject imaged. For example, image noise may include variations in brightness or color and may include what is sometimes referred to as graininess found in an image. Diffusion may include convolution of the original image 12 with a Gaussian filter that increases in width.

Image noise may be removed, for example, by removing pixel segments having fewer than a predetermined number, such as a number in the range of 10 to 25, of contiguous pixels with the understanding that such small segments may not be features of the subject's face.

Top hat segmentation 28 may be performed on an image 12 such as the geometrically normalized 23 image 12 in certain embodiments, after anisotropic diffusion 26 has been performed, to further extract features from the image 12. Top hat segmentation 28 may be used to extract small elements and details from the extracted features. For example, a feature extracted using anisotropic diffusion 26 may be further extracted using top hat segmentation 28.

The original image 12 may be subtracted from the anisotropically diffused image 12 by subtracting the pixel intensity values of the original diffused image 12 from corresponding pixel intensity values of the opened image 12. The result of that may be used to segment and extract features from the top hat transformed image.

The top hat segments may also be binarized, for example, to make the segments white or 1-valued pixels and the non-segment portions of the top hat segmented image black or 0-valued pixels, for example, from a visual perspective.

When binarizing 28 the image 12, the pixels may initially be viewed on an intensity scale, each pixel, for example, having an intensity on a scale of 0-255. A threshold may then be selected so that pixels having an intensity below the threshold are assigned zeros, which may be visualized as black, and pixels having an intensity above the threshold are assigned ones, which may be visualized as white, for example.

The threshold used during binarization may be set at various levels. The threshold may be set low, for example at 85 on a scale of 0-255, so that more features that exhibit visual light intensity may be recognized as light pixels and, for example, assigned one values, than would be recognized as light pixels if the threshold were set higher. Alternately the threshold may be set near mid-range, such as at 128 or it may be set high in the range, such as around 170 to reduce the number of pixels recognized as light and, thereby, reduce artificial or non-feature carrying pixels or segments made up of contiguous pixels.

In a binarized image 12, pixels may be viewed as white and black. White top hat segmented images 12 may be obtained using an anisotropically diffused image 12. The anisotropic diffusion of the image 12 may reduce noise in the image without blurring edges of features found in the image 12. Then, the image 12 may be opened by dilation of the original image 12 followed by erosion of the result. The top hat transformation may be equal to the difference between the intensity of pixels in the image being processed and the result of the open function.

Image noise may include spurious and extraneous information in an image or processed image, such as the top hat and binarized image 28. Image noise may be removed, for example, by removing pixel segments having less than a predetermined number of pixels, such as a number in the range of 10 to 50, of contiguous pixels with the understanding that such small segments may not be features of the subject's face.

Segments of contiguous pixels that are smaller than a predetermined threshold (number) of pixels may be removed from the image 28. Segment removal may, thus, be used to discard minor features that may not be consistently detected, noise, and to ensure that only prominent and consistent segmented features are extracted and matched between sample images of an individual. That may be done to improve the chance that artificial features and segments, for example those caused by noise or reflections that do not represent features of the subject, are not considered during matching.

An elliptical mask may also be applied to the feature segmented image 24 to ensure that features and segments near the outer borders of the image 24, for example features that are not on the face of the subject or that are not face-based, such as the ears or neck, may not be considered during matching. The elliptical mask may be applied after feature extraction so that artificial segments are not created and extracted through the appearance of an elliptical mask in the greyscale image.

Figure 3:
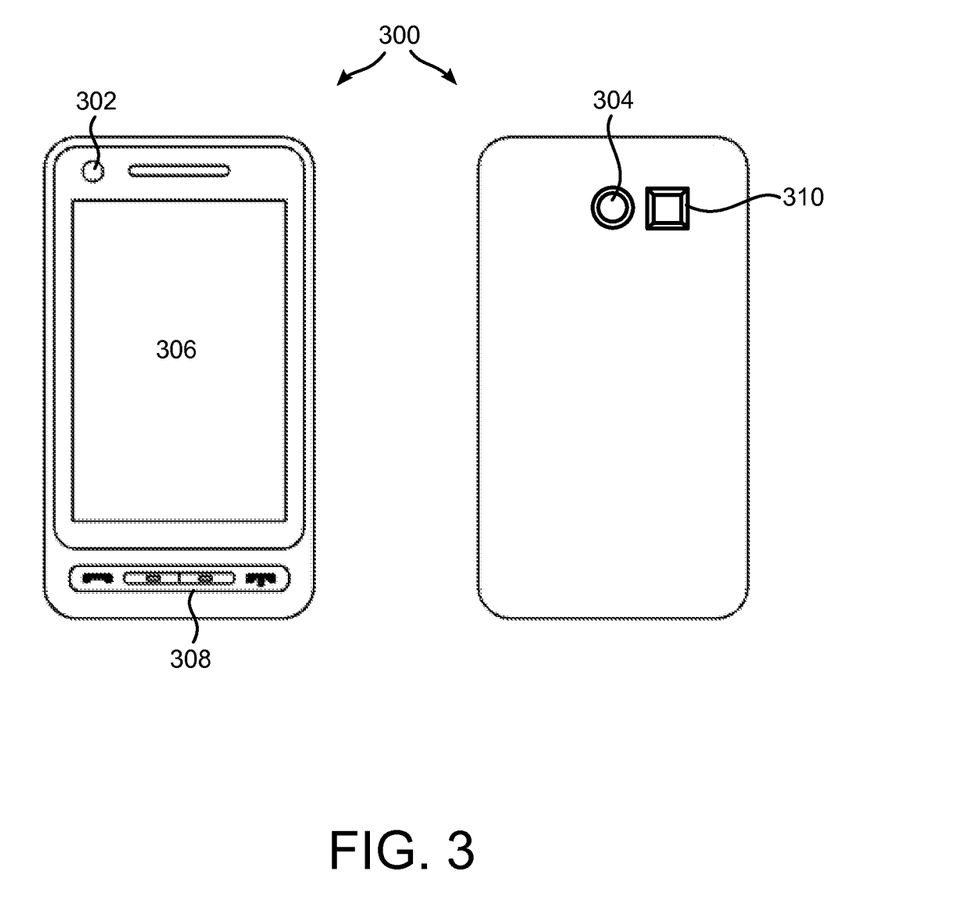
FIG. 3 illustrates an embodiment of a mobile device for use in facial-based authentication.

Matching of images 12 at 40 may be performed in a variety of ways. The images 12 to be matched may include a live image of a person currently standing in front of a camera 302 or 304 of a mobile device 300, an image of that person placed in front of the camera 302 or 304, and a stored image of that person. In certain embodiments, all three of those images 12 will be matched to assure, for example, that a live person requesting access is the same person depicted in an image provided by that person at the time of access request, and a stored image of the same person. One or more of those three images 12 may be (or may have been) subject to processing according to one or more of the processes described above and herein.

The image 12 of the subject that is provided by that person at the time access is requested may, for example, be a photograph of the person requesting access found in a government issued identification document that is held up by the live person near the face of that person for reimaging by the camera. Then a match between the live person image or images being taken currently, the photographic image concurrently provided by the live person, and an image of a person stored in or accessible to the confirmation system, may be made. If all three of those images are determined to be of the same person, and that person is a person who is permitted access to, for example, a software program that may be run on the mobile device, then the requestor is permitted access, as requested.

Thus, in an embodiment wherein three images 12 are compared to confirm the identity of the subject, the subject holds a photograph of the subject near or next to the face of the subject while an image 12 is taken of both the live subject and the photograph. Then, before confirmation that the live subject is approved for access by comparison of the live subject to one or more stored gallery images 12, the image authentication system 10 confirms that the live subject is the same subject depicted in the photograph. Thus, the image authentication system 10 may further capture an image 12 of a photograph of the subject in the same image frame in which the live subject is captured using the mobile device 300 camera 302, 304. The image authentication system 10 may also cause the processor (as described herein, such as with respect to FIG. 4) to separate the image 12 of the photograph of the subject from the image 12 of the live subject, convert the photographic image to greyscale if that image is in color, detect the eyes of the subject in the photographic image, fix at least one of the left eye and the right eye in a predetermined position in a photographic image field, scale a face in the photographic image to a standard size based on the location of the eyes in the photographic image, equalize lighting on a left side of the face and a right side of the face in the photographic image, binarize the photographic image, group contiguous pixels in the binarized photographic image into segments, identify features of the face in the photographic image, remove segments having fewer than a predetermined number of contiguous pixels from the features of the face in the photographic image, mask the photographic image to remove segments around the face, including ears and neck of the subject, compare the live image to the photographic image, and determine whether the live image and the photographic image display the face of the same person.

Matching may be performed in the image authentication system and method 10 by one or more matching systems. A first matching system may be referred to as a global matcher 42 and a second matching system may be referred to as a local matcher 44.

In an embodiment of global matching 42, features that have been extracted, for example, using feature extraction 24, from a first image 12 are compared to features extracted from a second image 12. A score, which may be a ratio of matching pixels to total pixels may be determined that indicates the level of any match found between the first image 12 and the second image 12. This score or ratio measures the overlap of extracted segments between the subject image 12 and a reference image 12. The score or ratio of the two feature segmented images 12 may be computed through convolution. In convolution, the probe image may be slid pixel by pixel across the gallery image in a top to bottom and left to right fashion, comparing the two images 12 at each relative position or in the vicinity of that position, thereby making a pixel by pixel match between the images 12.

To account for the small differences that exist in the segmented features from different samples of the same subject, a predetermined window, such as a 5×5 window, may be formed around a white pixel for template matching of pixels that are not in precisely the same location. Thus, for example, if for a white pixel in the probe segmented image, there is another white pixel in the 5×5 neighborhood of the corresponding position on the gallery segmented image 12, then the pixels may be said to be matched.

In an embodiment of local matching 44, fiducial or reference points in images 12 may be compared. For example, an end of a feature segment in a live image 12 provided by the camera 302, 304 and from which features have been extracted at 24 can be compared to a stored reference image 12 from which features have been extracted to determine whether a similar segment exists in the reference image 12 and whether that segment ends in a similar location.

Another example of a fiducial or reference point that can be compared in features extracted from two images 12 is a point where a segment branch occurs in a first image 12, a still image 12 presented to the camera 302, 304, for example, which can be compared to a second image 12, the reference image or live image, for example, to determine whether a segment branch occurs in or near the same location on the second image. Thus, segments that contact or intersect other segments may be given more weight in local matching than segments that do not contact or intersect other segments.

Alternately, segments that contact or intersect other segments may be the only segments considered in local matching because ridge segments with one or more branching segments may be effective to determine whether a local match exists.

To keep the local matching algorithm efficient, fiducial points can be removed post-processing. To define under which conditions false fiducial points are to be removed, a variable D, which represents the average inter-segment width or the average distance between two parallel neighboring segments, may be introduced. Four conditions that can be checked in fiducial point removal include: (1) if the distance between one branch point and one end point is less than D and the two points are located in the same segment, remove both points; (2) if the distance between two branch points is less than D and they are in the same ridge, remove both branch points; (3) if two end points are within a distance D and their directions are coincident with a small angle variation, and no other termination is located between the two endpoints, then the two endpoints can be regarded as false fiducial points derived from a broken segment and removed; (4) if two end points are located in a short ridge with length less than D, the two end points can be removed.

Fiducial points that are closer to one another than a predetermined number of pixels may be eliminated to reduce the computational complexity of the matching step. The fiducial point filtering may, for example, be done based on the correspondence of points being no more than 5 to 15, in this example 10, pixels apart. In such an embodiment, any points extracted from the same segmented features fewer than 10 pixels apart may be removed, for example, beginning with second point in the set or template. The local matcher 150 may also compare the fiducial points in feature extractions from one image 12 to another, after undesired points are eliminated, where such point elimination is used, to determine a number of points that match and a number of points that do not match in those two images 12.

A similar location may be defined as within a predetermined number of pixels, for example 5 to 15, from a location found in another image 12.

The global matching result and the local matching result can be normalized so that those results are on the same or comparable scales, for example a 0-1 scale. A fused score may then be determined at 50 based on the normalized results of both global matching and local matching.

The score may be created for one or more of i) comparison of an image 12 taken of a live subject and a still image 12 identification photograph of that person that is provided by the live subject; ii) comparison of an image 12 taken of a live subject and a gallery image 12 stored in a database; and iii) comparison of the still image 12 identification photograph of that person that is provided by the live subject and a gallery image 12 stored in the database. A matching decision may then be made at 52 based on those one or more scores.

When an image 12 of a live subject is to be captured, whether the image 12 is a video or one or more still images, a shape may appear on the view finder of the camera, which may be the screen of a mobile device, and the subject may place his or her face or a desired portion of his or her head, head and shoulders, or any desired portion of his or her person in the shape. The subject may attempt to fill the shape with a desired portion of his or her person to standardize the photograph or to ensure capture of the necessary portion of the subject at a desired image size. Instructions may also or alternately be provided on the screen 306 to assist in image capture.

The shape appearing on the view finder can be any desired shape including a circle, an oval, or a rectangle.

A standard distance for the subject to be placed from the camera 302, 304 may be established and may be communicated to the subject. For example, the mobile device 300 may be held at arms-length from the subject when the image is captured.

Figure 2:
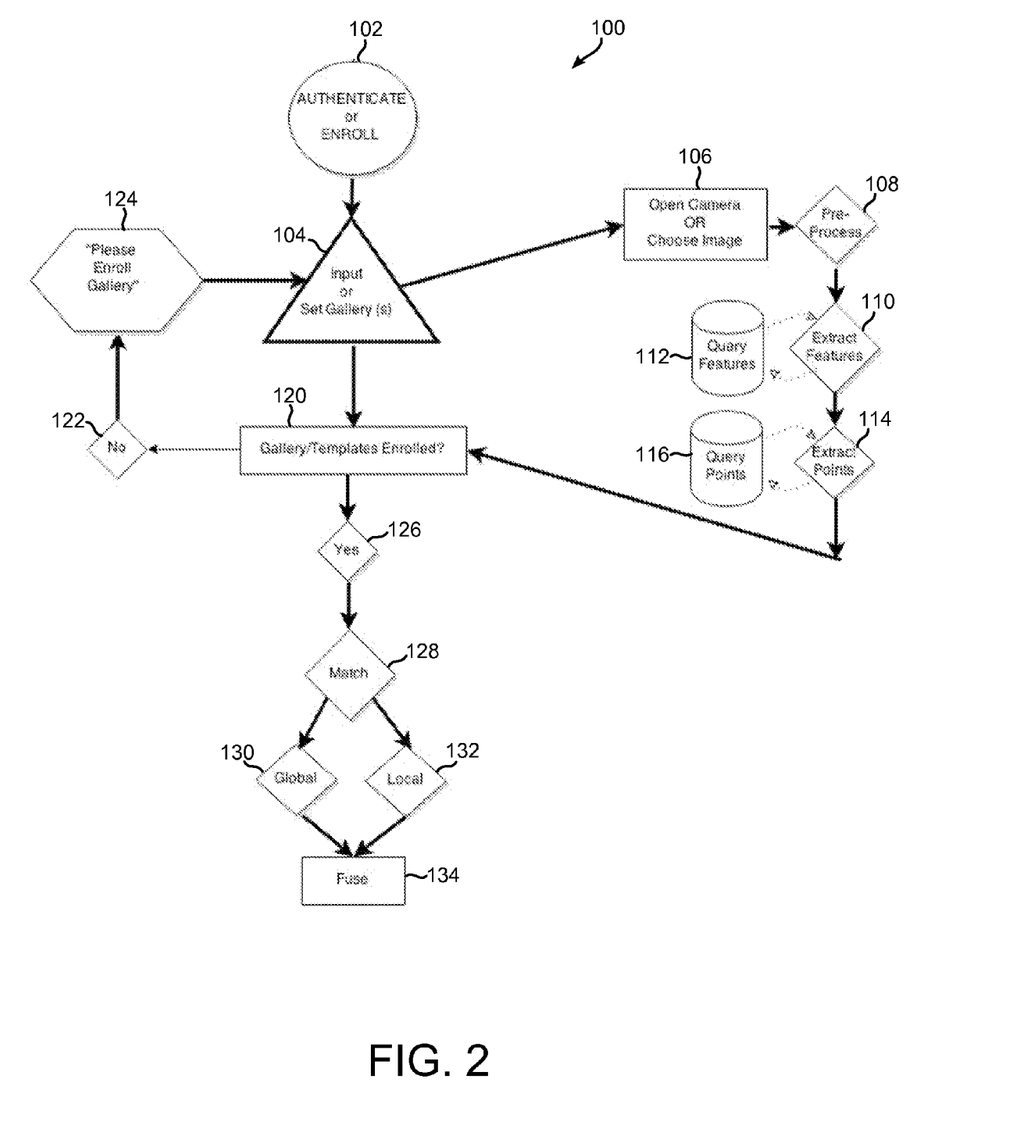
FIG. 2 illustrates an embodiment of a method of providing access based on facial-based authentication.

FIG. 2 illustrates an embodiment of a system and process 100 for enrolling and authenticating a subject in an image authentication system, such as the image authentication system 10, for example. At 102, a subject may select whether they wish to enroll in the image authentication system or be authenticated by the image authentication system. That selection may be performed in various ways including, for example, by selecting one of two or more facilities presented on a computer or mobile device screen using, for example, touch screen, a mouse device, or a keyboard.

At 104, the process 100 for enrolling and authenticating a subject in an image authentication system will permit one or more gallery images (e.g., images 12 as described above) to be input into the system 100 and, when an appropriate number of gallery images of an acceptable quality have been input, the system 100 will permit the gallery to be set. A subject or user may be provided with a choice of creating a gallery or authenticating the subject against a previously input gallery by the system 100 and may select whether to input images or to select that subject's gallery. The process for enrolling and authenticating a subject in an image authentication system 100 may require a predetermined number of images be input in a gallery for any subject and may require that the images input are of a good enough quality to be matched to the subject when that subject requests authentication, for example, to access a program, application, or location.

At 106, when a selection is made to create a gallery at 104, the subject may be instructed by the system, for example using text displayed on the screen 306 or mobile device 300 generated audio or voice instructions, for image capture. For example, the subject may be instructed to stand in a predetermined location, to look at the camera 302, 304, which may, for example, be in a mobile device 300 held by the subject, and the subject may be instructed to actuate a button when the image is ready to be captured. The system may process a captured image at 106, determining whether the image is of a quality from which the subject can be identified, and then display the image to the subject. The subject may then choose to add the image to the subject's gallery in the system 100 or may reject the image and have the image retaken.

At 108, preprocessing of the image takes place. Such preprocessing may include, for example, as described above with respect to the authentication system and method 10 of FIG. 1, conversion of the image to greyscale 18, eye detection 20, and geometric normalization 23. Features are extracted at 110 (e.g., as described with respect to method 10 at 24) and the extracted features may be stored in a storage device 112 for future reference. Points are extracted at 114 (e.g., as described with respect to method 10) and may be stored in a storage device 116 for future reference.

At 120, a determination is made as to whether the subject has a gallery of images of himself or herself enrolled in the system 100. If the subject does not have a gallery enrolled in the system 100, the subject is requested to enroll a gallery at 124. If the subject does not have a gallery enrolled in the system 100, the subject may be returned to 104 for enrollment.

If the subject does have a gallery enrolled at 120, then one or more images of the subject may be captured at 128 and a determination of whether the subject image matches one or more gallery images of the subject may be performed. That matching may include global matching 130, local matching 132 and fusion 134, which may operate similar to that described in connection with global matching 42, local matching 44, and fusion 50 discussed elsewhere herein.

FIG. 3 illustrates a mobile device 300 that may be used in embodiments of image authentication, such as the systems and methods 10 and 100 and otherwise as described herein. The mobile device 300 illustrated includes a front camera 302, a rear camera 304, a screen 306, control buttons 308, and a flash 310. The mobile device 300 may also contain computing devices as described herein or otherwise included in such mobile devices 300, including a processor 950 or microprocessor and memory 962 and may have stored thereon various software applications. Thus, in one embodiment, image authentication software may be installed on the mobile device 300 and may operate by requesting that the owner of the mobile device 300 provide a gallery of images of that owner. To capture an image of the owner, the owner may select whether one or more images (e.g. image 12 described herein) are to be acquired using the front camera 302 or the rear camera 304. The owner may then hold the mobile device 300 at arms-length or another desired distance from the owner with the selected camera 302, 304 directed at the owner. The screen 306 may act as a view finder at this time and may show the image to be captured. The screen 306 may also include the outline of a shape. The owner may then move his or her arm, hand, or body to place his or her face in the center of the screen 306, possibly within the shape and extending to or nearly to the shape but not extending beyond or far beyond the shape. The owner may then actuate the camera 302, 304 so that the image shown on the screen is captured and stored in the memory of the mobile device 300. Such image capture may be performed both to create a gallery of images of the owner and to authenticate the owner as described herein.

Once a gallery of images of the owner have been taken and are stored in the mobile device 300, the image authentication system can be used to permit only the owner to access desired programs or functions of the mobile device 300. For example, if the owner wishes to make photographs stored on the mobile device 300 accessible only to the owner, the owner can establish the image authentication system as a gatekeeper for photographs on the mobile device 300. Then, when access to the photographs on the mobile device 300 is desired, the subject initiates the photograph storage aspect of the mobile device 300 and the mobile device will request that the requestor capture one or more images of the owner or other user having approved access using the mobile device 300 camera 302, 304. The image authentication system then determines whether the current subject matches the subject in the gallery. If the image authentication system determines the current subject does match the subject in the gallery then access is permitted to the photographs on the mobile device 300. If the image authentication system does not determine the current subject matches the subject in the gallery then access to the photographs on the mobile device 300 is denied.

Figure 4:
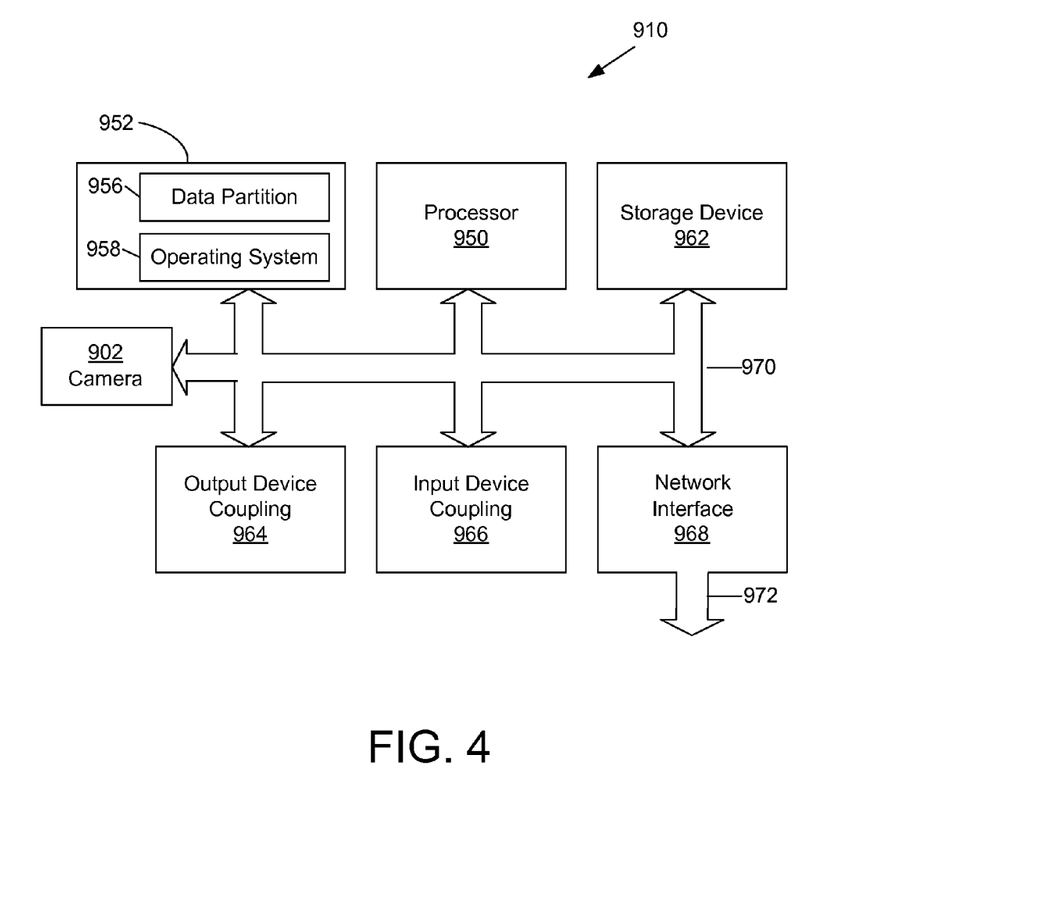
FIG. 4 illustrates an embodiment of a facial-based authentication system.

FIG. 4 illustrates mobile device hardware 910 that may be used in an embodiment of an image authentication system, such as one of the image authentication systems 10 and 100 described herein. As shown in FIG. 4, the computing device 910 may include a processor 950, memory 952, a storage device 962, a coupling for an output device 964, a coupling for an input device 966, a communication adaptor 968, and a camera 902. Communication between the processor 950, the storage device 962, the output device coupling 964, the input device coupling 966, and the communication adaptor 968 is accomplished by way of one or more communication busses 970. It should be recognized that the control circuitry 910 may have fewer components or more components than shown in FIG. 4. For example, if a user interface is not desired, the input device coupling 966 or output device coupling 964 may not be included with the control circuitry 910.

The memory 952 may, for example, include random access memory (RAM), dynamic RAM, or read only memory (ROM) (e.g., programmable ROM, erasable programmable ROM, or electronically erasable programmable ROM) and may store computer program instructions and information. The memory 952 may furthermore be partitioned into sections including an operating system partition 958 where system operating instructions are stored, and a data partition 956 in which data is stored.

The processor 950 may be any desired processor or microprocessor, including a processor in a mobile device or tablet or a processor in a general purpose computer or server. The processor 950 may, for example, be an Intel® type processor or another processor manufactured by, for example AMD®, DEC®, or Oracle®. The processor 950 may furthermore execute the program instructions and process the data stored in the memory 952. In one embodiment, the instructions are stored in memory 952 in a compressed or encrypted format. As used herein the phrase, "executed by a processor" is intended to encompass instructions stored in a compressed or encrypted format, as well as instructions that may be compiled or installed by an installer before being executed by the processor 950.

The storage device 962 may, for example, be non-volatile battery backed SRAM or another device or signal that can store digital information. The communication adaptor 968 permits communication between the mobile device 910 and other devices or nodes coupled to the communication adaptor 968 at the communication adaptor port 972. The communication adaptor 968 may be a network interface that transfers information from a node such as a general purpose computer to the mobile device 910 or from the mobile device 910 to a node. It will be recognized that the mobile device 910 may alternately or in addition be coupled directly to one or more other devices through one or more input/output adaptors (not shown).

The input device coupling 966 and output device coupling 964 may couple one or more input or output devices through cabling or wirelessly, for example. It will be recognized, however, that the mobile device 910 does not necessarily need to have an input device or an output device to operate. Moreover, the storage device 962 may also not be necessary for operation of the computer 910 as data may be stored in memory, for example. Data may also be stored remotely and accessed over a network, such as the Internet or wirelessly.

The elements 950, 952, 962, 964, 966, and 968 related to the mobile device 910 may communicate by way of one or more communication busses 970. Those busses 970 may include, for example, a system bus or a peripheral component interface bus.

The camera 902 may be any camera in a mobile device such as an Android device or iPhone. The image authentication system described in one or more of the embodiments herein may select an image or video acquisition available on the mobile device 910, adjusting, for example, the high dynamic range setting, flash, and square format on an iOS device. For example, if the mobile device 910 on which image authentication is taking place is an iPhone, the image authentication system may select to have a video of the subject taken at high resolution with high dynamic range setting in square mode and may sense the light present on the subject to determine whether to turn on the flash. The camera 902 may capture a visual image of the face of a person toward which the camera 902 is directed.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A mobile device image authentication system, comprising:
   a mobile device camera for capturing a current image of a subject in ambient visible light;
   a data storage device in the mobile device storing at least one of an image of the subject and data created from an image of the subject that includes features of the subject discernable in visible light;
   a processor in the mobile device coupled to the data storage device and the camera, the processor including instructions which, when executed by the processor, cause the processor to:
   receive the current image from the camera;
   convert the current image received from the camera to greyscale if the current image is in color;
   detect the eyes of the subject in the current image;
   move the face of the subject in the current image to fix at least one of the left eye and the right eye in a predetermined position in a current image field;
   scale the face in the current image to a standard size based on the location of the eye that has not been fixed in the current image;
   equalize lighting on a left side of the face and a right side of the face;
   binarize the current image;
   identify features of the face;
   remove segments having fewer than a predetermined number of contiguous pixels from the features of the face;
   mask the current image to remove segments around the face;
   compare the current image to one of the one or more stored images; and
   determine whether the current image and the one of the one or more stored images are of the same person.

2. The image authentication system of claim 1, wherein the processor further includes instructions which, when executed by the processor, cause the processor to access a function of the mobile device.

3. The image authentication system of claim 2, wherein the function is an application.

4. The image authentication system of claim 1, wherein the processor further includes instructions which, when executed by the processor, cause the processor to:
   determine a score based on the degree that the current image matches the one of the one or more stored images; and determine that the current image matches the one of the one or more stored images when the score is greater than a predetermined score.

5. The image authentication system of claim 1, wherein the mobile device camera is one of a front camera and a back camera of the mobile device.

6. The image authentication system of claim 1, wherein the processor further includes instructions which, when executed by the processor, cause the processor to group of the contiguous pixels by top hat segmenting the current image.

7. The image authentication system of claim 1, wherein the fixing of at least one of the left eye and the right eye in the predetermined position in the current image field includes moving the face until a first of the left eye and the right eye is in a first predetermined location and expanding or contracting the face around the first of the left eye and the right eye until the second of the left eye and the right eye is in a second predetermined location.

8. The image authentication system of claim 7, wherein the second predetermined location is within a plurality of pixels in the current image.

9. The image authentication system of claim 1, wherein the equalizing of the lighting on the left side of the face and the right side of the face includes performing contrast limited adaptive histogram equalization to normalize the pixel intensity distribution on the left and right sides of the face.

10. The image authentication system of claim 1, wherein the binarizing of the current image includes determining the intensity of each pixel in the current image and causing all pixels having an intensity below a predetermined threshold to be black and causing all pixels having an intensity equal to or above the predetermined threshold to be white.

11. The image authentication system of claim 1, wherein the comparing of the current image to one of the one or more stored images includes subtracting pixel intensity values of the binarized current image from the pixel intensity values of an anisotropically diffused current image.

12. The image authentication system of claim 1, wherein the masking of the current image removes features that are not on the face of the subject.

13. The image authentication system of claim 1, wherein the comparing of the current image to one of the one or more stored images includes globally matching the current image and the one of the one or more stored images and locally matching the current image and the one of the one or more stored images.

14. The image authentication system of claim 13, wherein the global matching of the current image and the one of the one or more stored images includes determining a ratio of pixels in the current image that match corresponding pixels in the one of the one or more stored images.

15. The image authentication system of claim 14, wherein for the pixels in the current image and one of the one or more stored images, a pixel in the one of the one or more stored images matches a pixel in the current image if those two pixels are within a predetermined number of pixels from one another.

16. The image authentication system of claim 13, wherein the local matching of the current image and the one of the one or more stored images includes comparing a plurality of reference points between the current image and the one of the one or more stored images.

17. The image authentication system of claim 16, wherein the reference points include at least one of a segment and a branch in a segment found in at least one of the current image and the one of the one or more stored images.

18. The image authentication system of claim 1, wherein:
the mobile device camera further captures an image of a photograph of the subject in the same image frame in which the subject is captured; and
the processor further includes instructions which, when executed by the processor, cause the processor to:
separate the image of the photograph of the subject from the current image;
convert the photographic image to greyscale if that image is in color;
detect the eyes of the subject in the photographic image;
move the face of the subject in the current image to fix at least one of the left eye and the right eye in a predetermined position in a photographic image field;
scale the face in the photographic image to a standard size based on the location of the eyes in the photographic image;
equalize lighting on a left side of the face and a right side of the face in the photographic image;
binarize the photographic image;
group contiguous pixels in the binarized photographic image into segments;
identify features of the face in the photographic image;
remove segments having fewer than a predetermined number of contiguous pixels from the features of the face in the photographic image;
mask the photographic image to remove segments around the face, including ears and neck of subject;
compare the current image to the photographic image; and
determine whether the current image and the photographic image are of the same person.

19. A mobile device image authentication method, comprising:
receiving a current image from a camera integral to the mobile device;
converting the current image received from the camera to greyscale if the current image is in color;
detecting eyes of a subject in the current image;
moving the face of the subject in the current image to fix at least one of the left eye and the right eye in a predetermined position in a current image field;
scaling the face in the current image to a standard size based on the location of the eye that has not been fixed in the current image;
equalizing lighting on a left side of the face and a right side of the face;
binarizing the current image;
grouping contiguous pixels in the binarized current image into segments;
identifying features of the face;
removing segments having fewer than a predetermined number of contiguous pixels from the features of the face;
masking the current image to remove segments around the face, including ears and neck of the subject;
comparing the current image to one of the one or more stored images; and
determining whether the current image and the one of the one or more stored images are of the same person.

20. A mobile device image authentication system, comprising:
- a mobile device camera for capturing a current image of a subject in ambient visible light and an image of a photograph of the subject in the same image frame in which the subject is captured;
- a data storage device in the mobile device storing at least one of an image of the subject and data created from an image of the subject that includes features of the subject discernable in visible light;
- a processor in the mobile device coupled to the data storage device and the camera, the processor including instructions which, when executed by the processor, cause the processor to:
  - receive the current image from the camera;
  - separate the image of the photograph of the subject from the current image;
  - convert the current image received from the camera to greyscale if the current image is in color;
  - convert the photograph of the subject received from the camera to greyscale if the photograph of the subject is in color;
  - detect the eyes of the subject in the current image;
  - detect the eyes of the subject in the photograph of the subject;
  - move the face of the subject in the current image to fix at least one of the left eye and the right eye in a predetermined position in a current image field;
  - move the face of the subject in the photograph of the subject to fix at least one of the left eye and the right eye in a predetermined position in a photograph of the subject field;
  - scale the face in the current image to a standard size based on the location of the eye that has not been fixed in the current image;
  - scale the face in the photograph of the subject to a standard size based on the location of the eye that has not been fixed in the current image;
  - equalize lighting on a left side of the face and a right side of the face in the current image using contrast limited adaptive histogram equalization to normalize the pixel intensity distribution on the left and right sides of the face;
  - equalize lighting on a left side of the face and a right side of the face in the photograph of the subject using contrast limited adaptive histogram equalization to normalize the pixel intensity distribution on the left and right sides of the face;
  - binarize the current image;
  - binarize the photograph of the subject;
  - group contiguous pixels in the binarized current image into segments using top hat segmentation;
  - group contiguous pixels in the binarized photograph of the subject into segments using top hat segmentation;
  - identify features of the face in the current image;
  - identify features of the face in the photograph of the subject;
  - remove segments having fewer than a predetermined number of contiguous pixels from the features of the face in the current image;
  - remove segments having fewer than a predetermined number of contiguous pixels from the features of the face in the photograph of the subject;
  - mask the current image to remove segments around the face, including ears and neck of subject;
  - mask the photograph of the subject to remove segments around the face, including ears and neck of subject;
  - compare the current image to one of the one or more stored images;
  - compare the photograph of the subject to one of the one or more stored images and the current image;
  - determine whether the current image and the one of the one or more stored images and the photograph of the subject are of the same person; and
  - access a function of the mobile device if there is a determination that the same person is depicted.

* * * * *